United States Patent [19]

Larsen

[11] Patent Number: 5,046,778
[45] Date of Patent: Sep. 10, 1991

[54] REDUCED WEIGHT VEHICLE DOOR PILLAR

[75] Inventor: Douglas C. Larsen, Milford, Mich.

[73] Assignee: The Standard Products Company, Cleveland, Ohio

[21] Appl. No.: 545,843

[22] Filed: Jun. 29, 1990

[51] Int. Cl.⁵ .............................................. B60J 5/00
[52] U.S. Cl. ................................ 296/202; 52/223 R; 296/188
[58] Field of Search ............. 52/223 R; 296/202, 205, 296/206, 188, 187, 189

[56] References Cited

U.S. PATENT DOCUMENTS

| | | | |
|---|---|---|---|
| 1,827,743 | 10/1931 | Groehn | 296/202 |
| 2,793,720 | 5/1957 | Hawes | 52/223 R |
| 3,217,075 | 11/1965 | Berger | 52/223 R |
| 3,251,162 | 5/1966 | Strimple | 52/223 R |
| 3,296,754 | 1/1967 | Silberkuhl | 52/223 R |
| 3,893,273 | 7/1975 | Sailor | 52/223 R |

Primary Examiner—John E. Murtagh
Attorney, Agent, or Firm—Harness, Dickey & Pierce

[57] ABSTRACT

A pillar for a vehicle door. A lightweight pillar having reduced rigidity is prestressed into a curved shape by an internal bolt or cable or the like to increase the strength thereof. This results in a lightweight pillar whose curvature is adjustable.

4 Claims, 4 Drawing Sheets

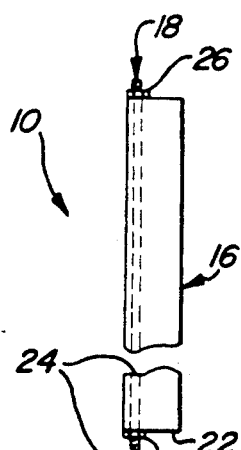
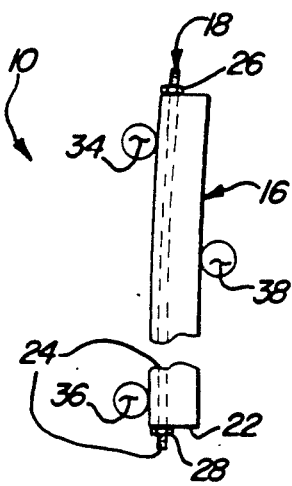
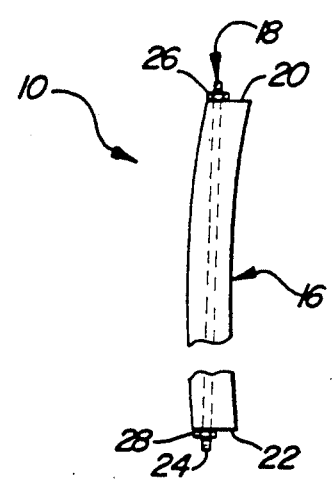
Fig-3  Fig-4  Fig-5
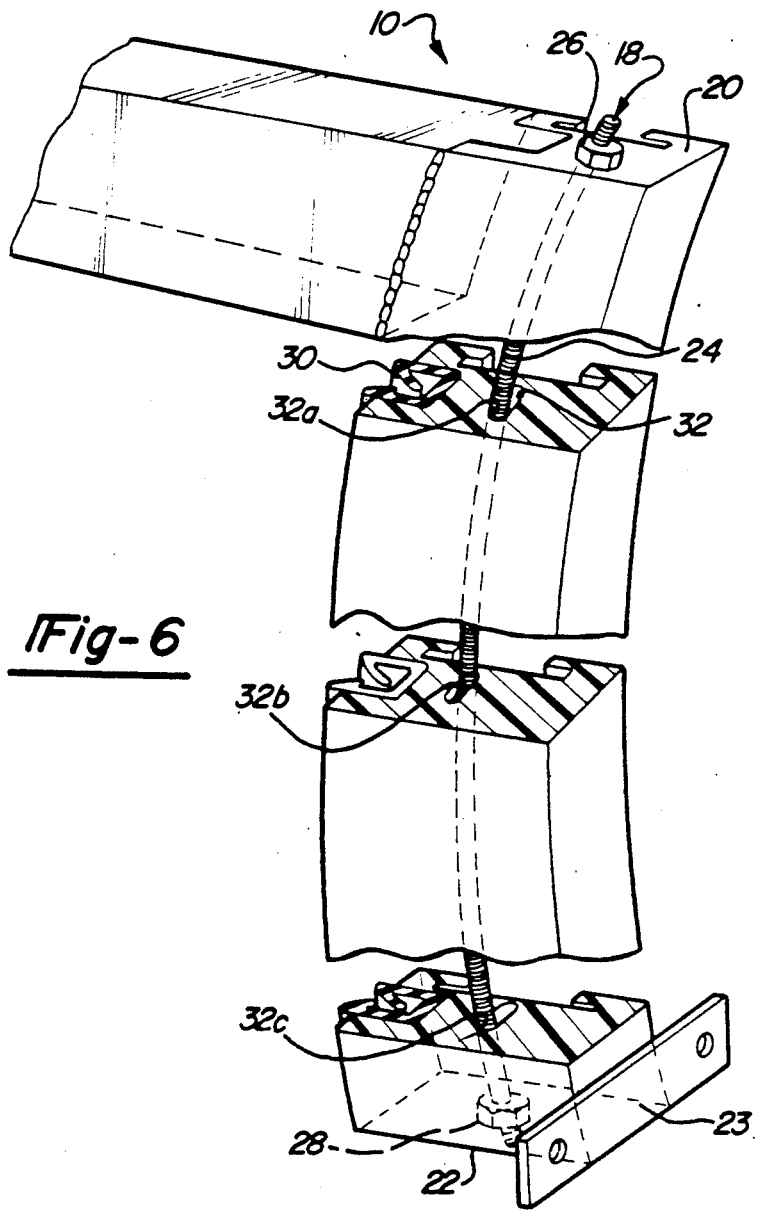
Fig-6

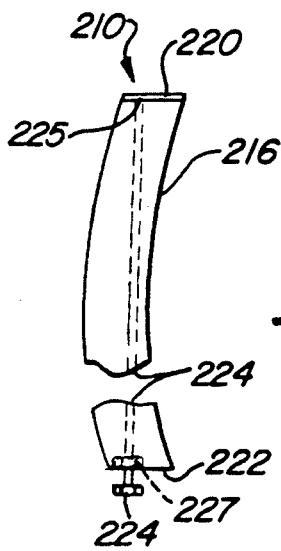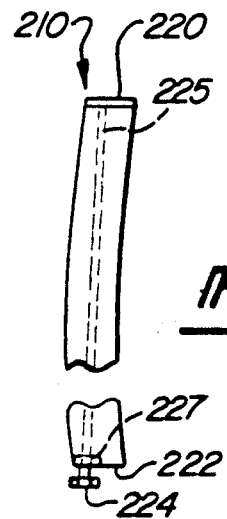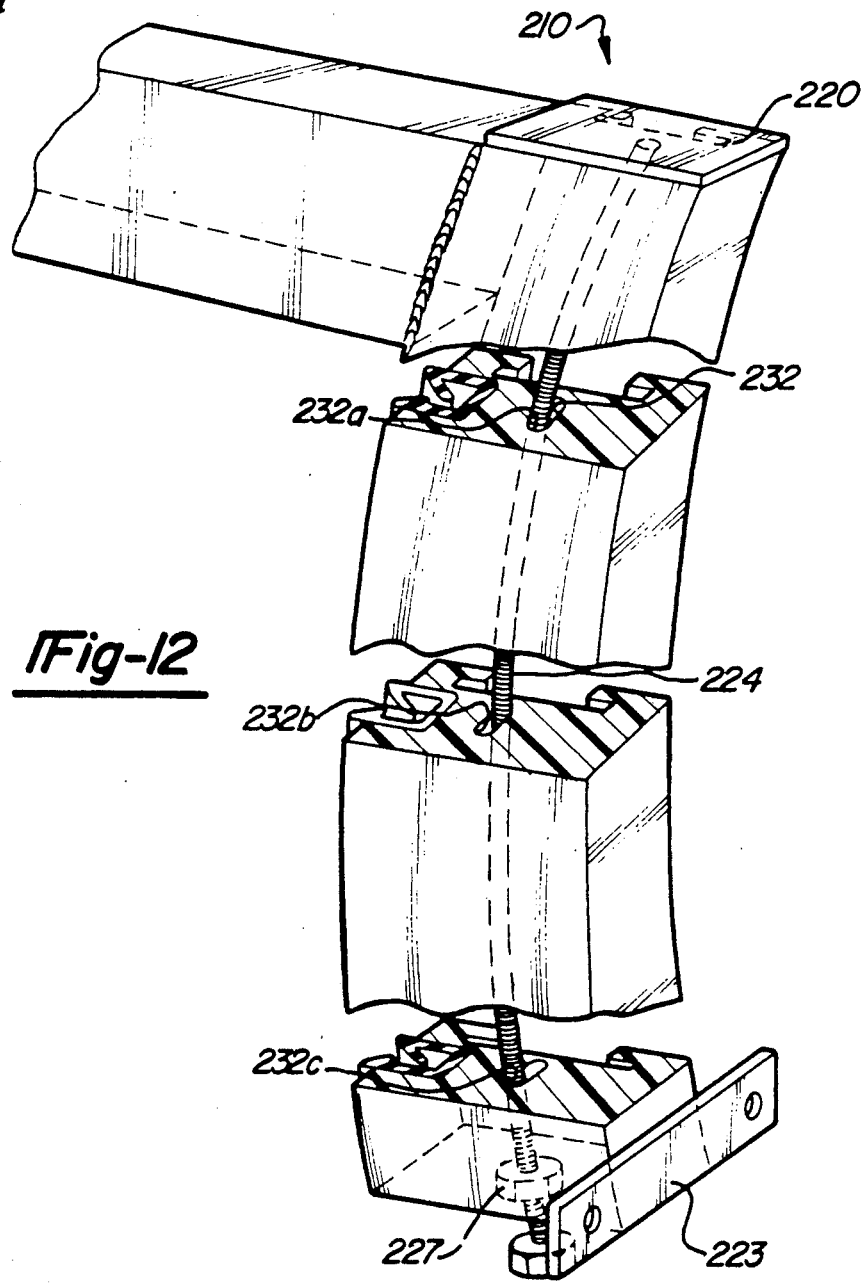

REDUCED WEIGHT VEHICLE DOOR PILLAR

BACKGROUND OF THE INVENTION

The present invention relates to a door pillar construction or a like frame member having reduced weight and suitable rigidity for use in door frames.

In recent years, due to new requirements, in reduction of energy consumption and for pollution control, it has been a goal in design of vehicles to reduce the weight of the final vehicles produced. In the past, many of the nonstructural areas have already been reduced in weight by substituting lighter weight materials, where possible, in areas such as grills, body panels and the like. While the average weight of vehicles has been reduced substantially in the past few years, vehicle manufacturers are still seeking ways in which to further reduce the weight of the vehicle.

Thus, in recent years manufacturers have looked for ways to reduce weight in areas which have heretofore been somewhat untouched, such as vehicle doors. Vehicle doors are particularly troublesome from a weight reduction design standpoint. This is because while a door is an aesthetic component of the automobile, a substantial amount of structural rigidity is also required. This makes it hard for designers to simply substitute prior materials with new lighter materials without reducing the structural integrity of the door. In some areas of the door, such as the panels, considerable weight may be saved by substitution with lighter materials. However, for the structural components of the door, such as the door pillar, there remains a need to reduce weight without sacrificing structural integrity. It is a goal in the present invention to provide a pillar section for a door structure which will substantially reduce the weight of this structural portion of the door while retaining the necessary structural rigidity.

The fit and detail of parts such as doors have also been sought after goals for improvements in final vehicles. Heretofore exact tolerances were necessary for producing acceptable fits on door pillars and the like. Thus, it would be an improvement in the art to provide a door pillar which could be adjustable to conform to the vehicle more closely. It is therefore also a goal in the present invention to provide such an adjustable pillar construction.

SUMMARY OF THE INVENTION

According to the present invention there is provided a pillar for the door of a vehicle comprising a preformed pillar member which has initial reduced rigidity and light weight characteristics. A means is provided for prestressing the pillar member wherein the rigidity of the preformed pillar is increased to suitable levels.

Thus, in accordance with the present invention a pillar section which presents considerable weight savings but is initially structurally inadequate can be prestressed to increase rigidity of the section, such that it may be useful in an automobile or other vehicle application. It is an advantage of the present invention that with the prestressing accomplished during bending of the pillar a very clean arcuate curve may be accomplished, which is desirable in many new vehicle designs.

Further advantages of the present invention will be readily appreciated by those skilled in the art in light of the description of the preferred embodiments given below and the drawings set forth herein.

BRIEF DESCRIPTION OF THE DRAWINGS

FIG. 3 is a rear view showing a pillar made in accordance with the teachings of the present invention, prior to prestressing thereof;

FIG. 4 is a rear view of the pillar of FIG. 3 in a fixturing machine prior to prestressing and forming of the final pillar;

FIG. 5 is a rear view of the pillar of FIGS. 3 and 4 in the final formed prestressed configuration;

FIG. 6 is a detailed perspective view partially broken away and in section showing the pillar of FIG. 5 in an assembled position with a header of a vehicle door;

FIG. 10 is a rear view of an alternate embodiment of a preformed pillar made in accordance with the teachings of the present invention;

FIG. 11 is a rear view of the pillar of FIG. 10 in the final prestressed position; and FIG. 12 is a detailed perspective view broken away and in section of the pillar of FIG. 11 showing the prestressed pillar in use with a header of a vehicle.

DESCRIPTION OF THE PREFERRED EMBODIMENTS

Figure 1:
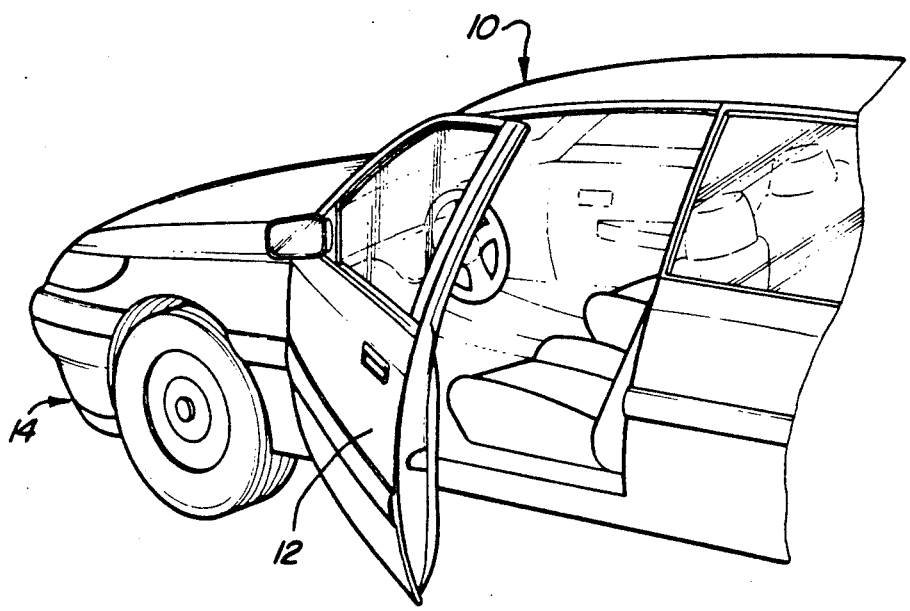
FIG. 1 is a perspective view of a typical vehicle incorporating a pillar construction of the present invention in the 'B' pillar location.
Figure 2:
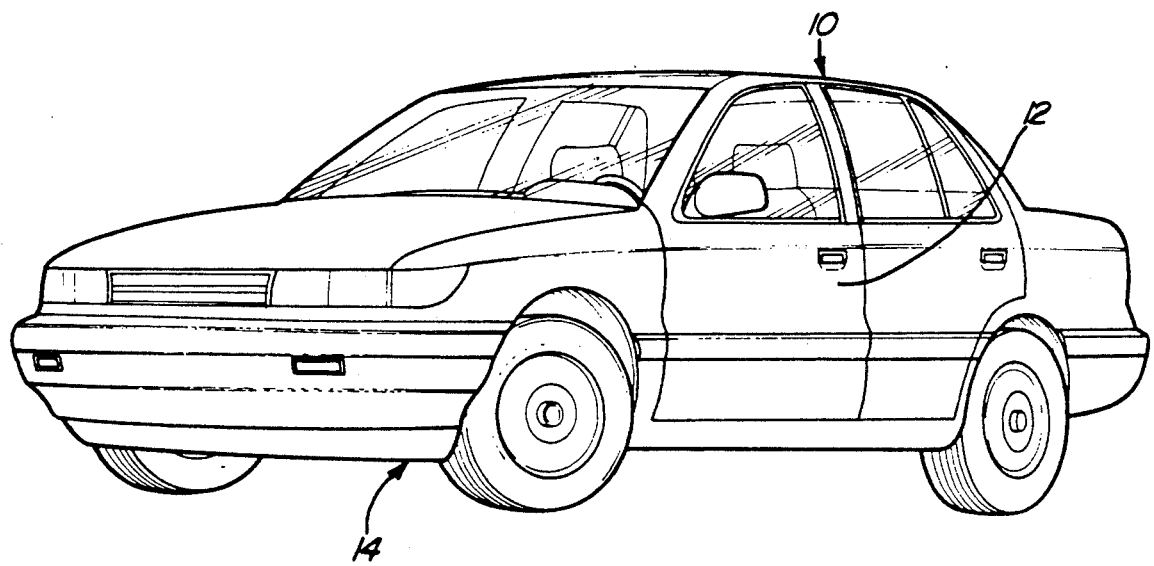
FIG. 2 is an overall perspective view of the vehicle of FIG. 1 in which the pillar of the present invention could be useful.

In accordance with the present invention there is shown a pillar, generally indicated at 10, for a door 12 of a vehicle 14. Referring now to FIGS. 3-6, in accordance with the present invention a preformed pillar member 16 is provided which has reduced rigidity and light weight characteristics. A means for prestressing the pillar member, generally indicated at 18, is provided wherein the rigidity of the pillar member may be increased resulting in a lighter weight pillar member for use in an automobile.

The pillar member 16 has a first end 20 and a second end 22. The means for prestressing includes a prestressing member 24, which operatively acts on the ends 20 and 22 for prestressing the pillar member.

The prestressing member 24 may be a truss rod with a pair of nuts 26 and 28 adherently attached thereto at the ends thereof. The nuts 26 and 28 may be tightened on the truss rod to tension the truss rod and act to compress the ends 20 and 22 together. As may be suitable in certain applications other prestressing type members such as Kevlar ® or Dacron ® fibers, wire or cables and the like could be utilized with suitable ratchet type or thumb screw tensioning assemblies, (i.e. like tightening of a guitar string) to produce a properly prestressed pillar member.

The preformed pillar member 16 includes a glass run channel 30. A fixturing member 23 is provided on the end 22 by fixturing the member to a vehicle door. The pillar has an internal ovoid slot 32 provided along the length of member 16 such that during the prestressing operation the prestressing member 24 may internally traverse the rod in a non-coplanar arrangement with the resulting curvature of the pillar, such as shown in FIG. 5.

In a preferred embodiment a lightweight glass filled polymer is utilized as the lightweight reduced rigidity material for producing the pillar. Thus, the initial preformed pillar could be extruded or injection molded. Of course, other lightweight materials, such as metals, carbon graphite composites or engineering type polymers could also be advantageously used in accordance with the teachings of the present invention.

In a first embodiment of the present invention, shown in FIGS. 3-6, the initially preformed pillar member is formed in a substantially straight configuration, as shown in FIG. 3. It is generally desirable in automobiles today to provide a curved pillar, which can be accomplished in the present invention by providing fixturing members 34 and 36 on a first side with a center fixturing member 38 on the second side. Thus, these fixturing members would provide an initial bend such that when the member 24 is tensioned a resulting curvature results. The tension member is non-coplanar with the curve to keep the member 16 in tension and curved.

Referring now to FIG. 6, the non-planar characteristic of the prestressing member 24 is illustrated in that the member 24 is at a first side of the slot 32 at the upper portion 32a of the slot 32. In approximately the center 32b of the slot 32 the member is all the way over to the other side of the slot and thereafter returns to the first side of the slot 32 at the bottom portion of the slot 32c. Thus, in the pillar construction of the present invention a light weight composite article is provided which has the resulting rigidity characteristics necessary in a door frame due to the prestressing of the pillar member increasing the structural rigidity of the pillar.

Figure 7:
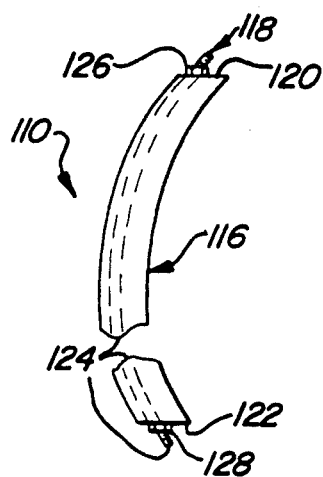
FIG. 7 is a rear view of an alternate embodiment of a pillar construction made in accordance with the teachings of the present invention in the preformed state.
Figure 8:
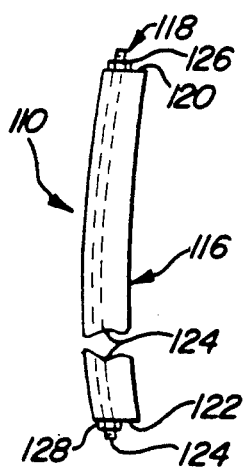
FIG. 8 is a rear view of the pillar assembly of FIG. 7 in the final formed position.
Figure 9:
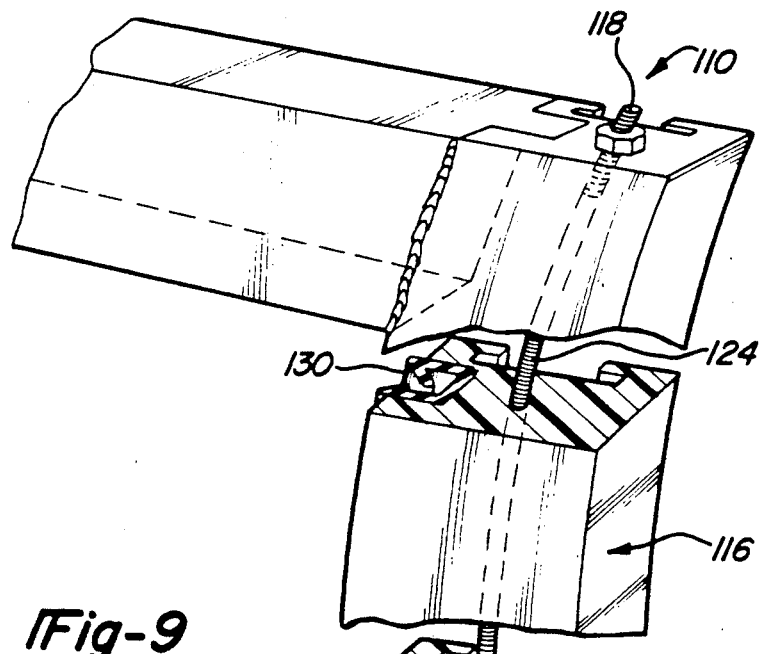
FIG. 9 is a detailed perspective view broken away and in section showing the pillar of FIG. 8 in use in a header location of a vehicle door environment.
Figure 9:
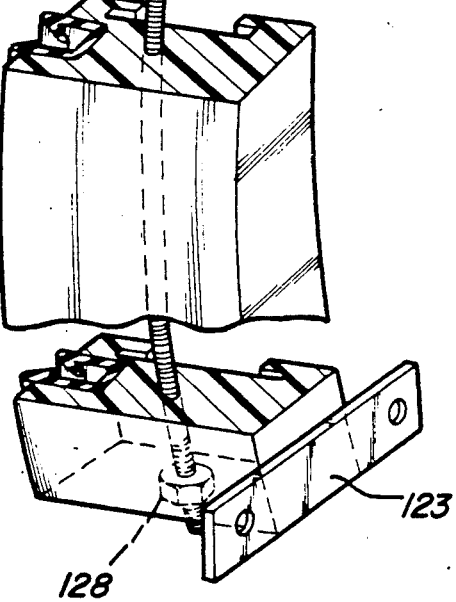

Referring now to FIGS. 7, 8 and 9, wherein like numbers differing by 100 refer to like elements, there is shown an alternate embodiment of the present invention 110. In an alternate embodiment of the present invention, the preformed member 116 is originally formed in an over-bent configuration, as shown in FIG. 7, with the tensioning member 124 coplanar with a curvature of the member 116. Thus, a single hole or orifice is provided in the member 116 for insertion of the prestressing member 124. Thereafter, by moving the nuts 126 and 128 inward for compressing ends 120 and 122, the member 116 is prestressed in an arcuate curvature which is less than the originally preformed shape, thus, accomplishing the same structural rigidity characteristics as in the first embodiment.

Referring now to FIGS. 10, 11 and 12, wherein again like numerals refer to like elements differing in numbers by 100, a still alternate embodiment 210 of the present invention is shown. This embodiment is similar to the previous embodiments except for the fact that the prestressing member 124 is placed under compression to produce a final prestressed pillar 216. This invention differs from the previous inventions in that the upper end 222 is sealed such that the upper end 225 of the element 224 cams against, side 222. This is accomplished in that a fixed nut 227 is provided at the lower end 222 such that the threaded rod 224 may be placed under compression by turning of it and lengthening of the rod within the member 216. Thus, referring to FIG. 10, the member 216 is initially provided with a non-coplanar tensioning member 224 inside an over-bent preformed pillar 216. Upon turning of the bolt 224 the member 225 cams against the inner portion of end 220, thus, placing the member 224 in compression and reducing the arcuate curvature of the pillar to the position shown in FIGS. 11 and 12.

Thus, in accordance with the teachings of the present invention materials lighter in weight than the structural steel presently used may be incorporated while retaining the structural integrity necessary to function in todays automobile. An additional advantage of the present invention is that the curvature of the pillar member is easily adjusted at or before assembly to provide an improved fit in the final vehicle.

While the above description constitutes preferred embodiments of the present invention it is to be appreciated that the invention is susceptible to modification, variation and change without departing from the proper scope and fair meaning of the accompanying claims.

What is claimed is:

1. In a motor vehicle including an engine, a body and at least one vehicle door, a reduced weight pillar construction for said vehicle door comprising:

a preformed pillar having a first predetermined shape, said pillar being made of a reduced weight material and having a light weight structurally substandard initial construction, said pillar including a first and a second end and having a means for forming a bore therethrough;

a stressing member inserted into said bore and secured to said first end and said second end in such a manner to form a second final curvature in the pillar, and to place the pillar under stress to increase the structural integrity of the pillar to an acceptable level wherein said stressing member is adjustable the curvature of the pillar; and a means for allowing attachment of said pillar to said vehicle door.

2. In a motor vehicle having an engine, a body and at least one vehicle door, a reduced weight pillar construction for said vehicle door comprising:

a preformed pillar having a first predetermined over--bent radiused curve, said pillar being made of a reduced weight material and having an initial substandard structural construction, said pillar including a first end and a second end and means for forming a bore therethrough, said bore following the contour of said first predetermined radiused curve;

a stressing member being of a size and shape to substantially fill the bore and extend to said first and second ends o the pillar member for acting to straighten the pillar to a second final curvature, thereby increasing the structural integrity of the pillar to an acceptable level, wherein said stressing member is selectively adjustable for adjusting the curvature of the pillar; and a means for providing attachment of said pillar to a vehicle door.

3. In a motor vehicle including an engine, a vehicle body and at least one vehicle door attached to said vehicle body of said vehicle door, a curved pillar construction for said vehicle door comprising:

a pillar body preformed in a first predetermined out of specification shape, said pillar being formed of a reduced weight material and having an initially substandard structural integrity, said pillar body having a means for providing a widened slotted bore through said pillar body, said pillar including a first end and a second end, said slot extending in a direction desired for the final curvature of the pillar, said first end including a terminal wall;

a stressing member for insertion into said bore and abutting the terminal wall;

a means on said second end for forcing said stressing member into said terminal wall for forming said pillar into a final curved shape and placing stress on the pillar construction to increase the structural rigidity of the pillar to an acceptable level said means being adjustable for adjusting the final curved shape of said pillar; and a means for allowing attachment of said pillar to said vehicle door.

4. In a motor vehicle having an engine, a vehicle body and at least one vehicle door an improved curved pillar construction of said vehicle door comprising:

a preformed pillar body having a first predetermined out of specification shape, said pillar being formed of a reduced weight and having an initially substandard structural integrity, said pillar body including a first end, a second end and a means for providing a widened slot shaped bore through the pillar member from said first end to said second end and extending in a direction toward the desired curve in said pillar;

a stressing member inserted in said slot shaped bore;

a means for placing said stressing member under compression between said ends for forming a second arcuate shape in said pillar body and for increasing the strength of said pillar to an acceptable level, wherein said means is adjustable for adjusting the final curvature of said pillar body; and a means for allowing attachment of said pillar to a vehicle door.

* * * * *

UNITED STATES PATENT AND TRADEMARK OFFICE
CERTIFICATE OF CORRECTION

PATENT NO. : 5,046,778
DATED : September 10, 1991
INVENTOR(S) : Douglas C. Larsen It is certified that error appears in the above-identified patent and that said Letters Patent is hereby corrected as shown below:

Column 2, line 53, "The - prestressing" should be --The prestressing--

Column 3, line 61, "against," should be --against--

Column 4, line 34, claim 1, after "adjustable" insert --for adjusting--

Column 4, line 42, claim 2, "initial" should be --initially--

Column 4, line 50, claim 2, "o" should be --of--

Signed and Sealed this

Thirteenth Day of July, 1993

Attest:

MICHAEL K. KIRK

*Attesting Officer*  *Acting Commissioner of Patents and Trademarks*